United States Patent [19]
Reed

[11] Patent Number: 4,485,691
[45] Date of Patent: Dec. 4, 1984

[54] SIMPLIFIED HYDROMECHANICAL STEERING TRANSMISSION

[75] Inventor: Bradley O. Reed, Pittsfield, Mass.

[73] Assignee: General Electric Company, Schenectady, N.Y.

[21] Appl. No.: 411,903

[22] Filed: Aug. 26, 1982

[51] Int. Cl.³ .................... F16H 47/04; F16H 37/06; F16H 1/42
[52] U.S. Cl. ........................ 74/687; 74/705; 74/714; 74/720; 74/720.5
[58] Field of Search .............. 74/687, 705, 714, 720, 74/720.5

[56] References Cited

U.S. PATENT DOCUMENTS

| | | | |
|---|---|---|---|
| 3,199,376 | 8/1965 | Delatio | 74/687 X |
| 3,383,953 | 5/1968 | Christenson | 74/687 X |
| 3,534,635 | 10/1970 | Polak | 74/687 X |
| 3,538,790 | 11/1970 | Polak | 74/687 X |
| 3,575,066 | 4/1971 | Livezey | 74/687 |
| 3,583,256 | 6/1971 | Livezey | 74/687 X |
| 3,590,658 | 7/1971 | Tuck | 74/687 |
| 3,596,535 | 8/1971 | Polak | 74/720.5 |
| 3,603,176 | 9/1971 | Tipping | 74/720.5 X |
| 3,815,698 | 6/1974 | Reed | 74/720.5 |
| 3,861,240 | 1/1975 | Nolan et al. | 74/687 |
| 4,164,155 | 8/1979 | Reed et al. | 74/687 |
| 4,164,156 | 8/1979 | Reed | 74/687 |
| 4,258,585 | 3/1981 | Orshansky | 74/687 |
| 4,306,467 | 12/1981 | Pollman | 74/687 |
| 4,309,917 | 1/1982 | Leet | 74/687 X |
| 4,345,488 | 8/1982 | Reed | 74/687 |

Primary Examiner—Allan D. Herrmann
Assistant Examiner—Dirk Wright
Attorney, Agent, or Firm—Francis K. Richwine

[57] ABSTRACT

A simplified range change mechanism for an infinitely variable, split output, synchronously shifting hydromechanical steering transmission having integral steering and at least three forward ranges having progressively lower torque and higher speed propulsion ratios in successively higher ranges while maintaining positive steer with a constant steering torque ratio in all ranges.

9 Claims, 4 Drawing Figures

SIMPLIFIED HYDROMECHANICAL STEERING TRANSMISSION

BACKGROUND OF THE INVENTION

1. Field of the Invention

This invention pertains to synchronous shifting multi-range hydromechanical steering transmissions for track-laying or skid-steered wheeled vehicles having hydraulic components to provide continuously variable hydrostatic drive ratios and mechanical components wherein selective operation of clutches or brakes causes the transmission to operate in a plurality of distinct hydrostatic, hydromechanical or mechanical ranges and wherein steering is effected by using one or more hydrostatic devices to impose a speed difference between left and right outputs. More specifically, this invention pertains to such transmissions having internal integral steering resulting from use of the same hydrostatic components for both drive and steer rather than from use of dedicated hydrostatic components added solely to impose a difference of speed to left and right outputs to effect steering (often referred to as "steerover"). In particular, this invention pertains to that class of multiple range steering transmission which also have distinctly different speed and torque ratios in the various ranges without having steer reversal, i.e., with "steer positive" steering and without having clutches in the steer path. In this respect, the speed and torque ratios referred to are understood to be those ratios existing between the output from the included hydrostatic component and the transmission output with the speed and torque ratios being related as inverse functions. That measurement is made between the hydrostatic and final outputs, especially in a split output transmission, because the ratios are fixed between transmission input and the input to the hydrostatic component and infinite between the input and the output of the hydrostatic component, i.e., within, or across, the hydrostatic component. A split output hydromechanical transmission, as the terminology is established in the art (Tuck, "Split Power Transmission", U.S. Pat. No. 3,433,095), is one in which a plurality of power paths from input to output are joined by a final power combining unit. In the split output example, the combining unit receives power in one path via a mechanical connection to transmission input and in another path from input via an included hydrostatic unit as opposed to a split input (Polak, U.S. Pat. No. 3,982,448).

2. Description of Prior Art

The transmission of Polak, U.S. Pat. No. 3,596,535, is an example of synchronous shifting multi-range hydromechanical steering transmissions using dedicated hydrostatic components for steering, i.e., a "steer-over" transmission. Polak is of particular interest because the different speed and torque ratios in different ranges are shown by the slope of the lines in FIG. 2 of that patent. The transmission of Tuck, U.S. Pat. No. 3,590,658, is one example of synchronous shifting multi-range hydromechanical steering transmissions using internal steer. However, this transmission is really two coordinated truck (single output) transmissions which have clutches in the steer path and require coordination of range shifts which is in turn complicated by the fact of steer reversal. The transmission of Polak, U.S. Pat. No. 3,538,790, is another example of a synchronous shifting multi-range hydromechanical steering transmission having integral or internal steer. It is full reversing, has a hydrostatic low range and a hydromechanical high range and has two mirror-image halves (i.e., two joined truck transmissions). The transmission disclosed in U.S. Pat. No. 3,815,698 (Reed) is a more pertinent example of a synchronous shifting multi-range hydromechanical steering transmission having positive internal steering. That transmission of Reed which is a predecessor model to the transmission from which the subject matter of this Application was derived has a hydrostatic combined reverse and first forward range and hydromechanical second and third forward ranges in which the speed and torque ratios, as defined above with respect to the field of invention, of second range are different from those of the first and third ranges which are identical.

The transmission disclosed in U.S. Pat. No. 4,345,488, Aug. 24, 1982 (Reed), is the most pertinent item of prior art and constitutes the immediate predecessor model as to which this invention constitutes a specific improvement. The transmission of that recent Patent is the first of its class (infinitely variable, split output, synchronously shifting, three or more range, multi-range hydromechanical steering transmission with internal steer) having a different and distinct torque ratio between the included hydrostatic component and transmission output in at least three ranges and establishes a new subclass of steering transmission. As noted in that Patent and its supporting documentation, the only previous specific recognition or teaching of progressively lower torque ratios in at least three ranges, which is the principal advantage of the subclass, occurred in "steer-over" steering transmissions (U.S. Pat. Nos. 4,164,155 and 4,164,156, Reed and Nolan, and Reed, respectively) and a single output, i.e., a truck transmission (U.S. Pat. No. 3,861,240, Nolan and Reed), although some other "steer-over" transmissions (U.S. Pat. Nos. 3,575,066; 3,596,535; and 4,258,585) could, with hindsight, be engineered to produce such results. Accordingly, the "best" and, in the sense of the foregoing classification, the only pertinent prior art is the "predecessor model" of U.S. Pat. No. 4,345,488 which uses a different and more complex gear train.

BRIEF SUMMARY OF THE INVENTION

This invention provides an infinitely variable, split output, synchronously shifting, multi-range hydromechanical steering transmission having a hydrostatic first range in a full reversing configuration and a hydrostatic reverse and first range in a non-full reversing configuration and in either instance additional second and third hydromechanical ranges based on a simplified gear train as compared to the prior art. A difference in right and left output speeds to effect steering, i.e., steering differential, is available in all ranges from the hydrostatic components which power the hydrostatic first range and also form the hydrostatic power path for the split output hydromechanical ranges. This is accomplished without clutches in the steer path and with positive steering (i.e., no steer reversal in alternate ranges). Propulsion ratios in each range are independent from each other and, as a result of that independence, each of the three ranges can be made to have an independent and distinct propulsive torque ratio while retaining the same steer torque ratio throughout. The independence of torque ratios permitting the transmission to have less torque and an extended speed range in each successively higher speed range is the principal contribution and identification of this class of inventions which fulfill the need in the prior art for multi-range hydromechanical steering transmissions with internal steering wherein gear ratios can be individually engineered in each range to best meet all requirements of torque, speed, vehicle weight, etc. This invention, as compared to the most pertinent prior art, accomplishes the end result in a single major axis configuration with a reduced number of gear train elements, i.e., a single planetary carrier and one fewer ring gear in the gear change mechanism.

DESCRIPTION OF THE DRAWINGS

FIG. 4 is an enlarged schematic representation of a section view of the gear train of FIG. 2 taken on the line 4—4.

DETAILED DESCRIPTION

General

Figure 1:
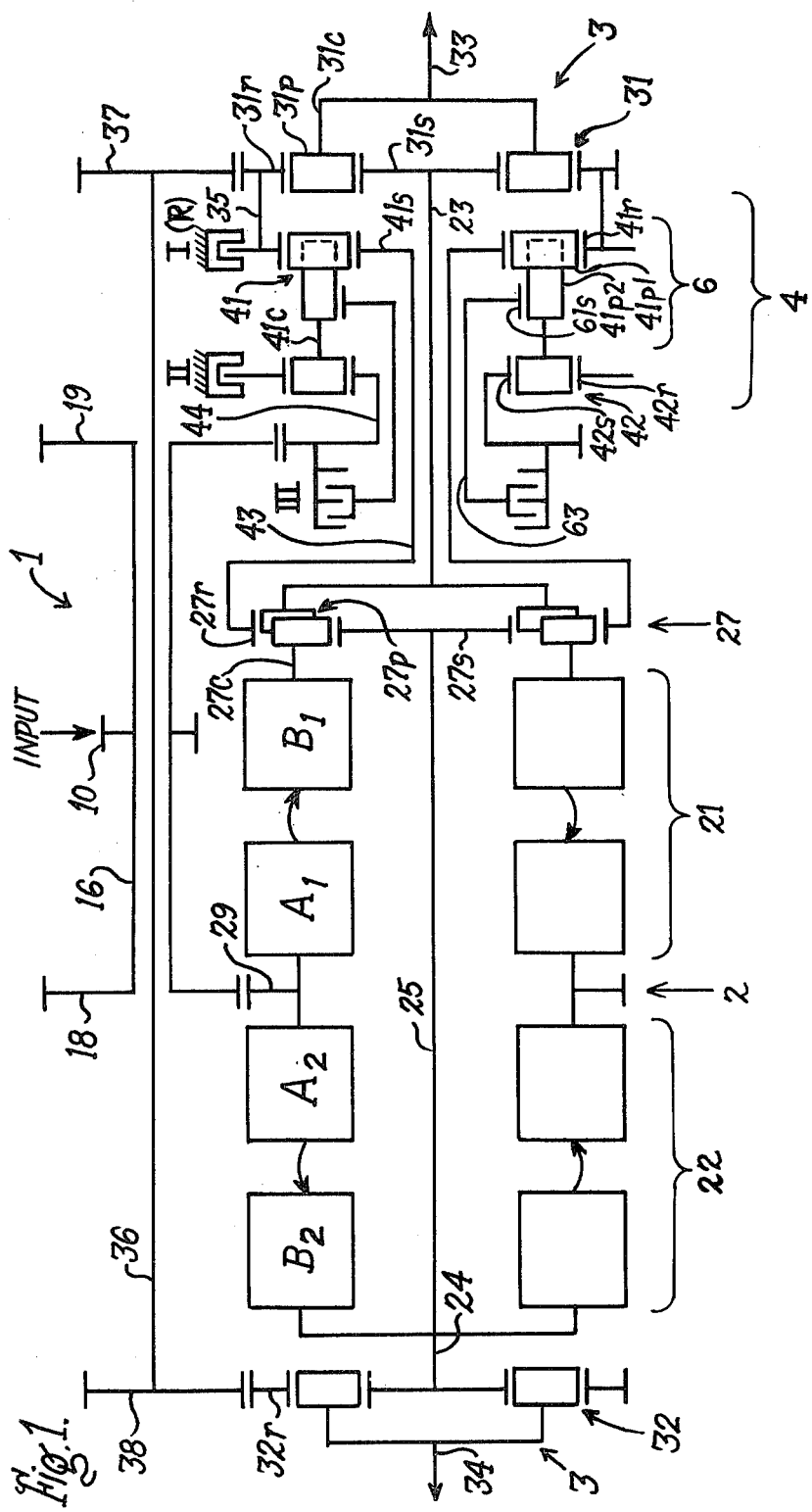
FIG. 1 is a schematic illustration of a single major axis embodiment of the invention.
Figure 2:
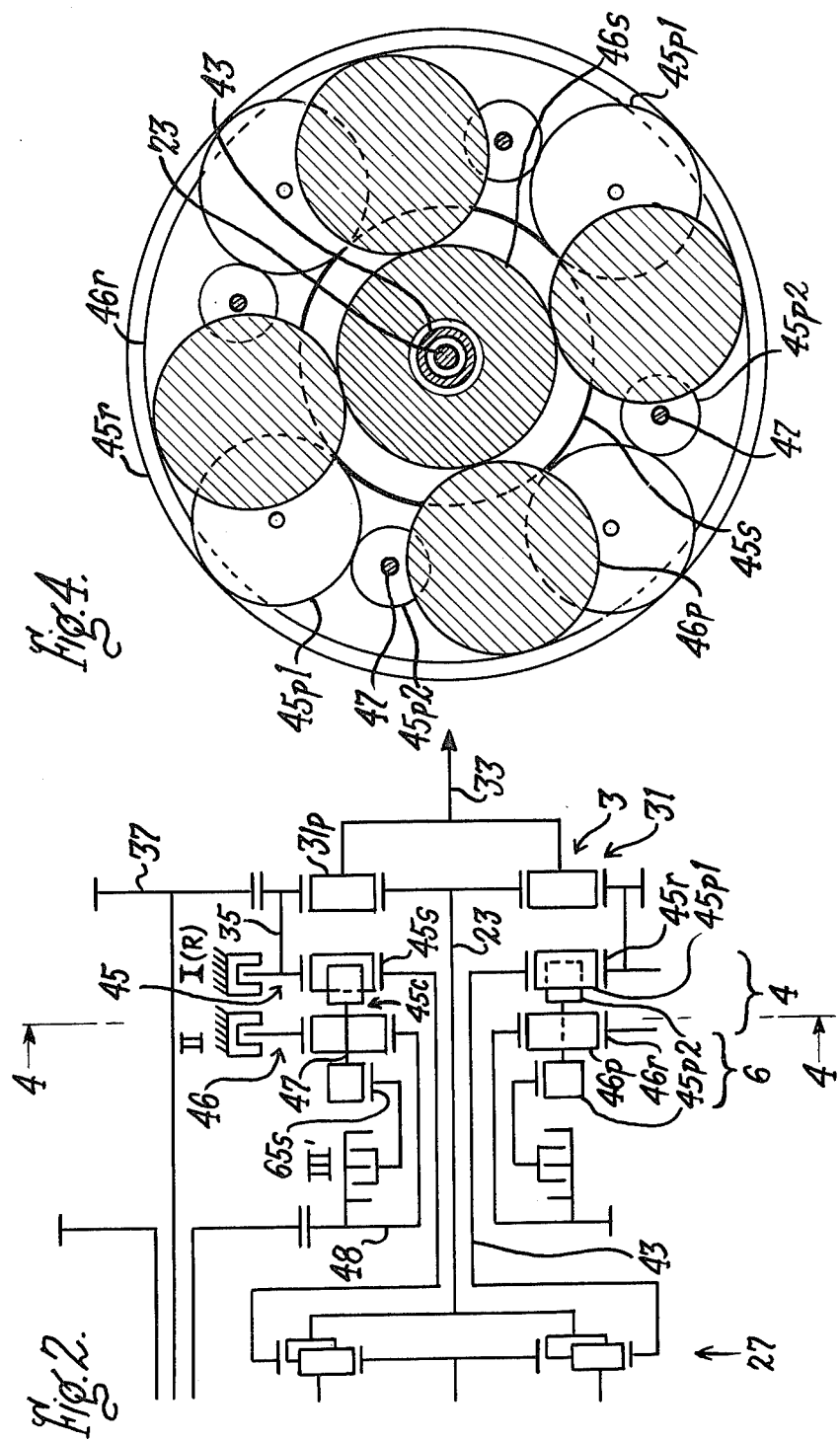
FIG. 2 is a schematic illustration of a modification of the embodiment of FIG. 1 permitting a more efficient packaging.

Multi-range hydromechanical steering transmissions, according to this invention, are made up of components as illustrated in FIGS. 1 and 2 of the drawings wherein reference numerals indicating components include an input gear train 1, a first range and steer mechanism 2, right and left output gears 3, and additional gear components 4 and 6 which are used to provide two additional hydromechanical ranges. The input gear train 1 supplies power simultaneously to the hydrostatic components 21 and 22 and to the additional range gear components. The hydrostatic components using infinitely variable pump units A and motor units B can produce a hydrostatic output over a range of motor unit output speed from a full forward to a full reverse. The hydrostatic output itself in this embodiment having a hydrostatic first range is directed to drive shafts through output reduction gearing 3 to constitute a first range which also provides steering by means of offsetting the capacities of the pump units A to create a difference of speed between the motor units B. The additional range gearing components 4 and 6 receive input from both the input component 1 and the hydrostatic mechanism 2 and serve to add different additional inputs to the output reduction gearing 3 to produce a plurality of hydromechanical speed ranges sequentially in excess of that produced by the first range which is hydrostatic. Steering in the additional ranges is still obtained by differential capacity settings between the hydrostatic pumps or A units which will cause the motors or B units to produce right and left speed differences to the output gearing to produce a steer effect which is independent of the range in which the transmission is operating. The unique characteristic of this particular transmission over and above its predecessor is the attainment of the independence of the speed and torque ratios in a minimum of three ranges in a transmission with a substantial reduction of gear train components. The unique features will be more throughly explained in connection with the operation of the transmission.

Preferred Embodiments

The invention is most easily implemented with major components located on a single axis as illustrated and could incorporate a full reversing mechanism whereas the illustrated embodiments are not full reversing and employ a single reverse and first range with second and third ranges being only forward ranges. In FIGS. 1 and 2, the major components of hydrostatic first range and steer mechanism 2, output gearing 3, second range gear component 4, and third range gear component 6 are all aligned on the main transmission axis defined by the output shafts 33 and 34 and the center shafts 23 and 25 running through those components. In addition, there is a minor axis determined by the cross shaft 36 and the input gear train 1.

Input Gear Train

The input gear train 1 as illustrated includes an input gear 10 which drives hollow shaft 16 carrying transfer gears 18 and 19 which are used to transmit the input power to other components with transfer gear 18 driving hydrostatic component 2 and transfer gear 19 providing mechanical drive input to the second and third range gear components 4 and 6. A full reversing system could be obtained by using additional elements as used in either FIGS. 1 or 2 of the predecessor transmission U.S. Pat. No. 4,345,488.

Hydrostatic Steer and First Range

Figure 3:
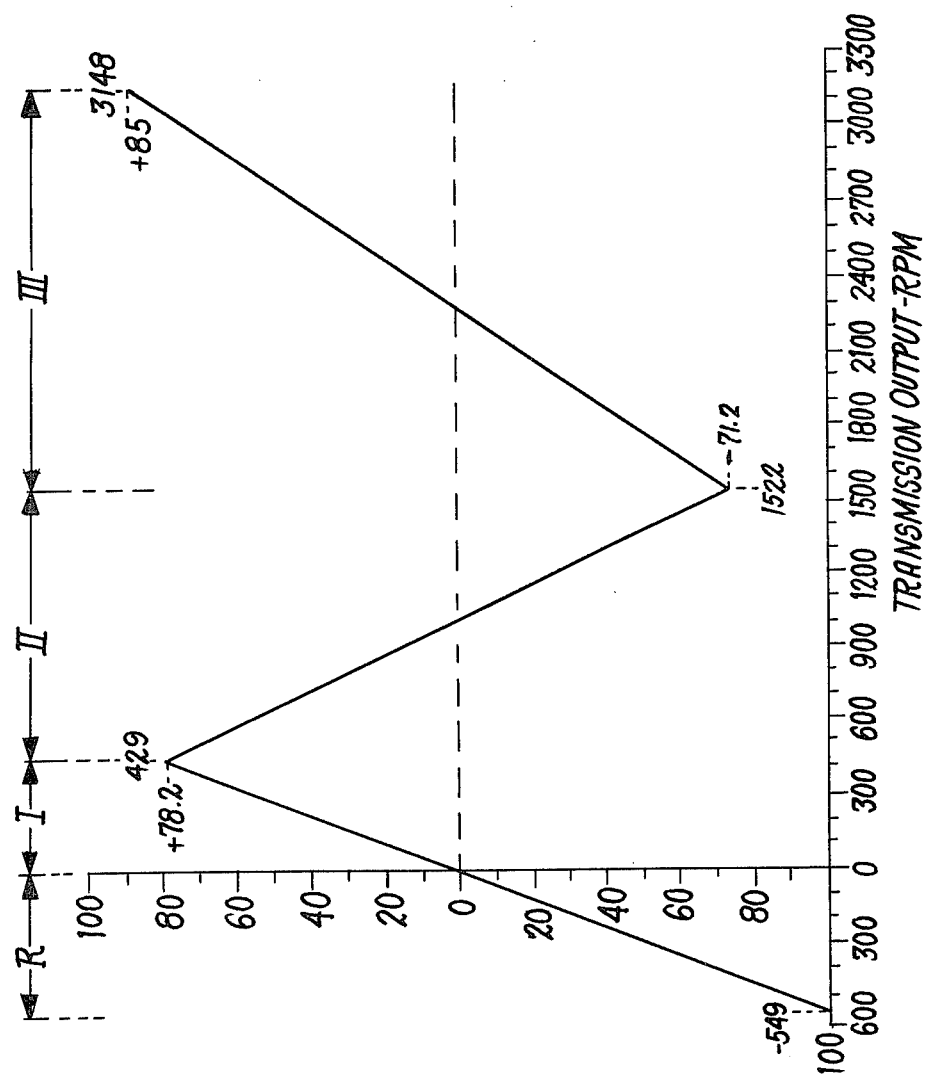
FIG. 3 is a graphic display, referred to as a stroke diagram, of a non-full reversing embodiment of a transmission according to the invention showing the relationships among the capacity of the variable displacement hydrostatic pump, the corresponding speed of its hydrostatic motor, and the resulting transmission output speed.

Although the invention illustrated could be implemented using any compatible pair of hydrostatic pump and motor units 21 and 22 wherein at least the pump A has infinitely variable capacity, the best mode contemplated for implementation of this invention is by use of ball piston hydrostatic devices as disclosed and illustrated in FIGS. 2 and 3 of U.S. Pat. No. 3,815,698. Therefore, the component 2 as illustrated is made up of variable capacity positive displacement ball piston pumps A1 and A2 connected to the input gear train by means of gear 29 and fixed capacity positive displacement motor units B1 and B2, each in a closed hydraulic circuit relationship with its respective hydraulic pump A whereby the B units can be made to turn at infinitely variable speeds in either direction corresponding to the capacity setting of the variable A units. Each of the motor units B is connected to a hydrostatic output shaft with the motor unit B2 being connected directly to hydrostatic output shaft 24 and with the motor unit B1 being connected to shaft 23 by means of the carrier of planetary gear set 27, the purpose of which will be more fully explained below. By varying the displacement of the pump units A, the shafts 23 and 24 can be driven hydrostatically at infinitely variable speeds from a maximum speed in one direction to a maximum speed in the other direction, either independently or coincidentally. Each of the hydrostatic output shafts 23 and 24 deliver the output speed of the corresponding hydrostatic motor B to the sun gear of output planetary set 31 or 32 of the output gearing 3. For convenience and clarity, the elements of planetary sets, i.e., the sun, the ring, the carrier and the planetary gears, are designated by the planetary set reference number followed by the appropriate letter s, r, c or p indicating the element so that the sun gear of planetary set 31 is designated 31s. This designation method permits reference to every element without innundating the drawings with excess reference numbers.

If the first range brake indicated by I(R) is activated, transmission output shafts 33 and 34 will be driven by the B units through the output planetary sets 31 and 32 at a sun-to-carrier reduction so that the output speed of each of the transmission output shafts in first range bears a direct relationship to the speed of the respective B unit. In the embodiment illustrated, which is not full reversing, with the brake indicated as I(R) engaged, the vehicle can be driven in a hydrostatic range from zero to first range top speed forward or in reverse according to the direction of rotation and change of displacement of the pump units A to constitute a combined first and reverse range. Steering, as in U.S. Pat. Nos. 3,815,698 and 4,345,488, is obtained by relative differences in the capacity settings of the pump units A with the result that the B units run proportionally at speeds sufficiently different from each other to produce output speed differences between shafts 33 and 34 to cause the vehicle to change direction. Steering through the use of this mechanism is infinitely variable between no steer and full pivot steer wherein pumps A1 and A2 would be stroked in opposite directions causing B1 and B2 to run, one forward, one in reverse.

Higher Ranges

In the FIG. 1 embodiment of the transmission, second and third ranges are provided by the gear train components indicated generally at 4 and 6 which denote parts of a compound planetary set having three sets of planetary pinions mounted on a single unitary carrier and interfacing with three sun and two ring gears wherein the sun and ring gears provide input and output functions similar to those of the gear trains 4 and 6 of U.S. Pat. No. 4,345,488. The second range component 4 is made up of a second range outer planetary set 41, a second range inner planetary set 42, wherein the pinions are on the unitary carrier 41c, and brake II. The third range component 6, however, includes only a third range sun gear 61s, extra planet gears (pinions) 41p2 on the same carrier 41c, clutch III and connecting gear elements. Both the second and third ranges are hydromechanical because there are both mechanical and hydrostatic inputs into components 4 and 6. As noted in the summary of the invention, in the general description of the invention, and as more fully described in U.S. Pat. No. 4,345,488, a primary characteristic of transmissions of the class of this invention is the fact that the hydrostatic contribution to the hydromechanical ranges, although derived from the same hydrostatic components that provide right and left speed differences for steering, is not limited to steer torque and speeds. This is accomplished through the use of planetary set 27, as one example of a speed averaging device which can be applied, to obtain the average of the B1 and B2 output speeds (i.e., "B average") for use as the hydrostatic input into the second and third range components. As already noted, hydrostatic motor B2 drives hydrostatic output shaft 24 directly whereas hydrostatic motor B1 drives hydrostatic output shaft 23 through the carrier of planetary set 27. Because motor B1 drives carrier 27c of planetary set 27 and motor B2 drives the sun 27s of that set by means of center shaft 25, and planetary set 27 was established as a 50/50 set, the average of the B1 and B2 speeds is produced on ring 27r of the planetary set irrespective of the value of either speed. Planetary set 27 as illustrated is a double pinion planetary set, i.e., having dual pinions 27p, as a practical way to obtain the proper ratio (i.e., 50/50) to produce the average speed output desired and may be the same type of planetary gear set illustrated in FIG. 4 of U.S. Pat. No. 3,815,698. While the B1 and B2 outputs are transferred to the transmission output sun gears 31s and 32s without interference for steer differential in second and third ranges, the B average speed as generated on ring gear 27r provides a hydrostatic input to the second and third range gear train and is passed from there to sun gear 41s by means of hollow shaft 43 concentric about shaft 23 to drive sun 41s hydrostatically without having a variation caused by steering.

Second Range

In second range, the function of which is generally the same as that of the second range gear trains of U.S. Pat. Nos. 3,815,698 and 4,345,488, hydrostatic input is provided on the sun of the portion of the compound planetary gear train 4 which corresponds to the outer second range set 41 of U.S. Pat. No. 4,345,488 and mechanical input is provided from transfer gear 19 to the sun gear 42s of inner second range set 42 (corresponding to the sun of U.S. Pat. No. 4,345,488) through the hollow interconnecting shaft 44. Therefore, in this second range component 4 with mechanical input on sun 42s and with brake II activated to ground ring gear 42r, the mechanical input, reduced by sun-to-carrier reduction, is generated on the unitary carrier 41c corresponding to the carrier of outer second range set 41 of U.S. Pat. No. 4,345,488. The reduced mechanical speed on the common carrier in combination with the B average hydrostatic drive on sun 41s produces, by means of the action of the first set of planet gears 41p1 which intermesh with both sun 41s and ring 41r, a hydromechanical resultant speed function on ring 41r which is transferred directly to the output ring 31r which is connected to ring 41r by element 35. With brake II engaged and brake I(R) disengaged, the second range component output speed acting on ring 31r and the B1 hydrostatic output on sun 31s cooperate to produce a final second range output on carrier 31c which is a further function of mechanical input speed and torque, B average speed, B1 speed, hydrostatic torque and the ratios of planetary sets 42, 41 and 31. The gear ratios of these planetary sets, therefore, can be calculated to give a desired torque ratio and speed range which is independent of and different from the ratios and speeds in the other ranges. This will be further commented on below.

The same second range output applied to ring 31r is also applied to ring 32r by means of cross shaft 36 and transfer gears 37 and 38 where it is combined with B2 speed to provide an output on shaft 34 differing from that on shaft 33 only by the right and left speed differences created to effect steering. In this embodiment, the cross shaft 36 runs through the hollow shaft 16 of the input gear train 1 so as to reduce the total amount of space necessary for packaging of the transmission. This is not necessarily a limitation on the transmission and the cross shaft can be located on its own separate axis or through a more complex input gear train providing for full reversal.

Third Range

Third range drive is created in this novel gear component at 6 by sun gear 61s in cooperation with the extra planet gears 41p2 in outer second range planetary set 41 to effect the result obtained by the full planetary sets 61 and 41 in the predecessor transmission of U.S. Pat. No. 4,345,488. Mechanical drive is applied to the sun 61s through hollow shaft 63 and clutch III which is engaged to activate the third range gear train component to cause extra planet gears 41p2 to add a mechanical input to the B average hydrostatic input placed on planet gears 41p1 by sun gear 41s to generate an intermediate hydromechanical product on ring 41r. The intermediate hydromechanical third range product is then transferred to ring gear 31r. Thereafter, a further combination is made in sets 31 and 32 with the appropriate individual B speed to produce the third range output on transmission output shafts 33 and 34. The compound planetary set 41 with the extra planet gears 41p2 used to sum in the third range mechanical input obtained through sun gear 61s and using a common carrier with the inner second range set 42 provides the distinguishing contribution and the key to the unique gear train of this invention. This gear train as compared to the predecessor avoids the extra planetaries used in the double set 61, saves one carrier and the inherent extra space and saves one ring gear, in effect obtaining the same result with nine (three suns, three planetaries, two rings and one carrier) rather than twelve (three suns, four planetaries, three ring gears and two carriers) elements. It also avoids the joining of elements such as a sun to adjoining carrier or a ring to adjoining carrier. With the proper selection of gear ratios in the planetary sets, the third range can be designed to produce the desired torque ratio and speed range independently of steering and without dependence on those of other ranges except to the extent that the gear ratios of planetary set 41 is involved in both the second and third ranges and must be compatible with all three ranges.

Reverse

The embodiments illustrated include a combination first and reverse hydrostatic range wherein reverse is obtained by "stroking" the A pump units in the reverse direction to cause the B units to run backwards from rest with the I(R) brake engaged. As already noted, the novel gear train could be implemented, without deviation from the invention in a full reversing embodiment by use of an input gear train like that of 1 in FIG. 1 of U.S. Pat. No. 4,345,488.

The brakes I(R) and II and clutch III referred to and illustrated in the Application and means for actuating them are contemplated to be hydraulically operated components normally used in transmissions of this type although alternatives such as electrically or mechanically operated components are feasible.

Alternate Embodiment

FIGS. 2 and 4 illustrate a modification of the novel gear train which permits use of the benefits of the invention in a modified package. In FIG. 2, which shows just the range package of a transmission, the components providing the second and third ranges are relocated, and form a slightly different gear train. All of the transmission except gear components 4 and 6 are identical to those of FIG. 1. In this case, the components 4 and 6 are still made up of a compound single carrier planetary set having, in addition to the carrier, three suns 45s, 46s, 65s, two rings 45r, 46r, and three sets of planetary pinions 45p1, 46p and 45p2, of which those designated as 45 constitute the outer second range portion and those designated as 46 constitute the inner second range portion. However, the third range portion, in this case sun 65s and clutch III, are both located between the second range mechanical input drive 48 and the inner second range portion of the compound single carrier set.

This FIG. 2 arrangement also has an outer second range sun 45s driven by B average through hollow shaft 43, an inner second range sun 46s driven mechanically by an interconnecting shaft, in this case 48, and a third range sun 65s driveable by mechanical input from clutch III, which all perform the same input functions as elements 41s, 42s and 61s of the FIG. 1 embodiment. Ring gears 45r and 46r and planetary pinions 45p1 also constitute identical equivalents to rings 41r, 42r and pinions 41p1 respectively. The pinions 45p2 and 46p, although performing the same functions as 41p2 and 42p respectively, have some different physical or spatial relationships with each other and with other elements as compared to their equivalents in FIG. 1. In the embodiment as illustrated in FIGS. 2 and 4, with the inner second range portion located between the outer second range and third range portions, the pinions 45p2, to be able to transfer a mechanical input from sun 65s to pinion 45p1, must pass through the inner second range portion of the planetary set. As illustrated, the pinions 45p2 are in effect dual or double ended pinions interconnected by reduced portions or shafts 47 passing between pinions 46p although, depending on the relative sizes of elements, there might be sufficient space for elongated pinions 45p2 without use of reduced portions 47. It is also contemplated that for certain gear ratio requirements, it might be more efficacious to place pinions 45p2 and 46p on common centers with pinions 45p2 passing axially through pinions 46p, with or without reduced portions.

Operation

Operation of the transmission in the embodiment of FIG. 1 is best explained by reference to that FIGURE and FIG. 3 simultaneously. Military or other heavy vehicles using transmissions of this type are generally propelled by a diesel or possibly a turbine engine which is operated at or near a constant speed. With such a power plant providing power at input gear 10 through a disconnect clutch or other connection, and with the hydrostatic units A1 and A2 set for zero displacement and range brake I(R) engaged, transfer gears 18 and 19 will be caused to rotate. Rotation of transfer gear 19 will cause a rotation of various elements in the mechanical drive portion of second and third range gear trains 4 and 6 but with no positive effect since brake II and clutch III are disengaged and ring gear 41r remains fixed along with ring gears 31r and 32r as a result of the engagement of range brake I(R). In the hydrostatic unit 2, the hydrostatic input gear 29 is driven by transfer gear 18 and causes hydrostatic units A1 and A2 to rotate, but since they are initially set for zero displacement there is no resulting movement of motor units B1 and B2.

First Range

As the displacement of the A units is increased from zero in the forward direction, the motor units B1 and B2 attain a forward speed proportional to the displacement of the A units causing a corresponding rotation of the hydrostatic output shafts 23 and 24 and also transmission output shafts 33 and 34 at a speed determined by the sun-to-carrier reduction in output gearing 3 driving against ring gears 31r, 32r held stationary by brake I(R). FIG. 3 illustrates this operation and acceleration in first range with the B speed and the A stroke advancing along the line indicated for first range in the area identified as I from zero to seventy-eight percent of full speed which is the predetermined range I to range II shift point. Some quantity less than one hundred percent is selected, in part, to make available an additional speed in each B unit to provide for a steering in either direction. The line in FIG. 3 also presents a graphic portrayal of the independence of torque ratio of the ranges by the fact that the slope of the line in each area representing a distinct range is different as will be examined later. During this period of acceleration in first range, ring gear 42r of the second range inner planetary set 42 (which had to run backwards initially because common carrier 42c, 41c was held stationary by the cooperation of brake I(R) and the initial zero speed of sun 41s reflecting the zero average B speed) has accelerated from its negative speed to zero. At this point, a synchronous shift can be made into the hydromechanical second range by actuation of brake II to "ground" ring gear 42r concurrently with release of brake I(R).

Second Range

After the shift to range II, the A units are "de-stroked", i.e., moved from the shift point capacity toward zero displacement, decreasing their capacities and slowing the B units as indicated by the reverse slope of the line in FIG. 3 in the second range area II. As the I-II shift takes place, ring gear 41r of the outer second range set and ring gears 31r and 32r of the transmission output sets which have just been released by brake I(R) begin to move in the forward direction, i.e., the direction which will add forward speed to the output carriers 31c, and 32c and continue to accelerate as the sun 41s driven by B average is slowed (with carrier 41 running at a nearly constant speed—which is a speed related to mechanical input reduced by the sun-to-carrier ratio of 42) responsive to the "de-stroking" of the A units. Gear ratios are such that the increase of forward speed of ring gears 31r and 32r is sufficient to overcome the decrease of speed of the sun gears 31s and 32s which also result from a slowing of the B units so that the total resultant effect on output carriers 31c and 32c is a constant (linear) increase in speed of those output elements through the point at which the capacity of the A units goes through zero to a displacement in the other direction and the B average speed goes to zero and then goes negative and until the hydraulic units and output suns 31s and 32s reach the maximum selected negative speed point for the range II to range III shift, which for this transmission is about seventy-one percent of full negative speed, again to allow a margin for steering differential and overall ratio considerations.

Third Range

At the II to III shift point, activation of the third range clutch III simultaneously with release of brake II connects third range sun gear 61s to the mechanical drive train to cause it to be driven at a constant speed derived from mechanical input. Since at the II to III shift point the A units are "de-stroked" to the established limit (71% negative) causing the B units to be running backwards at a speed corresponding to the A unit displacement, the stroking of the A units in the forward direction causes a positive acceleration of the B units through zero to a maximum forward speed. As the B units accelerate, the suns 31s, 32s and the B average shaft 43 and outer second range sun 41s also accelerate. With sun 41s accelerating and sun 61s running at a constant speed, the intermeshed outer second range planetary pinions as driven by those suns also change speed and cause their complex output to be transferred to ring 41r by 41p1 to drive rings 41r and 31r, 32r with a weighted average (or resultant) of the mechanical input on 61s and the hydrostatic B average on 41s. The interaction in the output sets 31, 32 produces a linear acceleration of the carriers 31c, 32c as depicted by the line and the abscissa scale in the area III of FIG. 3, the independent slope of which illustrates the independence of torque ratio in range III.

Alternative Embodiment

Operation of the gear train as modified and explained relative to FIGS. 2 and 4 is the same as for the FIG. 1 embodiment in spite of the structural differences.

Conclusions

This transmission constitutes a simplified and compact implementation of an infinitely variable, synchronously shifting, multi-range, split output, hydromechanical steering transmission having internal steering, three ranges, positive steer in all ranges, no clutches in the steer path and an independent and distinct torque ratio in each of three ranges, a combination first known in the art as a result of the predecessor transmission which is the subject matter of U.S. Pat. No. 4,345,488. This class of transmission provides a torque and speed range flexibility in steering transmission having internal steer which is comparable to that previously known only in truck (i.e., single output) transmissions and in steering transmissions using a "steer-over" steering system, i.e., having one or more hydrostatic components used only for steering. As noted above, the independence of the speed and torque ratios of the several ranges is illustrated by the difference in slope of the line in FIG. 3 for each range area, as more extensively discussed in U.S. Pat. No. 4,345,488.

Accordingly, the transmission of FIGS. 1 and 2 is the functional equivalent of the predecessor transmission of U.S. Pat. No. 4,345,488, in a "single major axis" embodiment (comparable to FIGS. 1 and 3 of that patent) but with a multi-range, synchronous gear train component that performs that function with a reduction of parts permitting a more efficient (smaller) packaging and providing for reduced weight as measured by pounds per input horsepower.

The invention as claimed is:

1. In a synchronous shifting, multi-range, split output, hydromechanical transmission having a mechanical input drive train, a hydrostatic component driven by said input drive train for producing a hydrostatic output, mechanical means defining plural independent power paths driven by said input drive train and said hydrostatic component to cause said transmission to be a split output transmission and a set of combining gears for producing a transmission output responsive to inputs received from either or both of two of said plural power paths of the split output transmission, and wherein said mechanical means includes a first power path mechanism interconnecting a first element of said combining gears with at least said hydrostatic component for causing the transmission to operate in one range; a range change mechanism included within said mechanical means constituting a second of said power paths of the split output transmission for causing the transmission to operate in two additional ranges having torque ratios distinct from each other and from that of said one range, said range change mechanism comprising:
(a) a compound planetary gear set including:
  (1) a single planetary carrier,
  (2) a plurality of sets of planetary pinions mounted on said planetary carrier, and
  (3) a plurality of sun and ring gear elements meshing with said pinions, said plurality of elements including elements responsive to said mechanical input drive train and to said hydrostatic output and including an element connecting said compound planetary gear set to a second element of said combining gears,
for selectively operating in two modes to produce a first hydromechanical output which is a function of said hydrostatic output and a mechanical input which is a reduction from that of said mechanical drive train and to produce a second hydromechanical output which is a function of said hydrostatic output and a mechanical input which is received directly from said mechanical drive train and for selectively transferring those hydromechanical outputs to said second element of said combining gears; and
(b) friction devices for selectively activating and inactivating selected elements of said plurality of sun and ring gear elements to cause said range change mechanism constituting said second power path to operate in either of said two modes to cause said transmission to operate in either of said two additional ranges or to be locked out of operation to cause said transmission to operate in said one range.

2. The transmission range change mechanism of claim 1 wherein:
(a) a first one of said sun and ring gear elements responsive to mechanical input is a first mechanical input sun gear driven by said mechanical input drive train;
(b) a first set of said plurality of sets of planetary pinions meshes with said first mechanical input sun gear;
(c) a first ring gear also meshes with said first set of planetary pinions; and
(d) a first friction device is a first brake for grounding said first ring gear;
whereby activation of said first brake causes said first sun, set of pinions and ring gear to constitute a reduction set to drive said carrier at a sun-to-carrier reduction from mechanical input.

3. The transmission range change mechanism of claim 2 wherein:
(a) another one of said plurality of sun and ring gear elements is a hydrostatic drive sun gear which is responsive to said hydrostatic output;
(b) a second set of said plurality of sets of pinions is meshed with said hydrostatic drive sun gear; and
(c) said element connecting said compound planetary gear set to a second element of said combining gears is a ring gear which intermeshes with said second set of pinions and constitutes an output ring gear;
whereby said hydrostatic drive sun gear, said second set of pinions, said carrier and said output ring gear constitute summing gears to drive said output ring as a function of said hydrostatic output and any drive placed on said second set of pinions or on said carrier.

4. The transmission range change mechanism of claim 3 wherein:
(a) still another of said plurality of sun and ring gear elements is a second said element responsive to mechanical input and is a second mechanical input sun gear;
(b) a third of said sets of pinions is meshed with both said second mechanical input sun gear and with said second set of pinions to constitute an additional input gear set; and
(c) another said friction device is a clutch for attaching said second mechanical input sun gear to said mechanical input drive train;
whereby activation of said clutch causes said second mechanical input sun gear to drive said third and said second sets of pinions with mechanical drive.

5. The transmission range change mechanism of claim 4 wherein the range change mechanism consists only of the foregoing components and:
(a) another friction device which is a second brake for grounding said output ring gear for locking out said range change mechanism;
(b) mechanical connecting devices interconnecting said sun gears with said mechanical drive train or said hydrostatic component respectively and devices supporting said pinions and said plurality of elements; and
(c) means for selectively activating said friction devices;
whereby activation of said second brake locks out said range change mechanism causing said transmission to drive solely through said first power path mechanism to constitute a first range;
whereby activation of said first brake activates said reduction set and said summing gears to drive said output ring gear with a hydromechanical function of inputs causing said transmission to drive through both said power paths simultaneously to constitute a hydromechanical split output second range; and
whereby activation of said clutch activates said additional input gear set and said summing gears to drive said output ring gear with a second hydromechanical function of the inputs causing said transmission to drive through both said power paths simultaneously to constitute a hydromechanical split output third range.

6. In a multi-range hydromechanical transmission having a mechanical input drive train 1, a hydrostatic component 2 driven by said input drive train for producing at least one hydrostatic output, a set of transmission output gears 31 and means connecting one element of the output gears to at least the hydrostatic component to drive the transmission in one range, a range change mechanism for causing the transmission to operate in two additional ranges which are synchronous shifting hydromechanical ranges having torque ratios distinct from said one range and distinct from each other comprising:
(a) a planetary carrier 41c, 45c;
(b) a reduction gearing 42, 46 comprising:
  (1) a first sun gear 42s, 46s driven by the mechanical input drive train 1,
  (2) a first set of planetary pinions 42p, 46p mounted on said carrier 41c, 45c meshed with said first sun gear,
  (3) a first ring gear 42r, 46r meshed with said first set of planetary pinions, and (4) a first brake means II for selectively immobilizing said ring gear 42r, 46r to cause said carrier to be driven at a speed reduced from that of said mechanical input drive train;

(c) summing gearing 41, 45 comprising:
(1) a second sun gear 41s, 45s driven by said hydrostatic component 2,
(2) a second set of planetary pinions 41p1, 45p1 mounted on said carrier 41c meshed with said second sun gear,
(3) a second ring gear 41r, 45r meshed with said second set of planetary pinions,
(4) drive connecting means 35 interconnecting said second ring gear with a second element of said transmission output gears,
(5) a second brake means I(R) for selectively immobilizing said second ring gear to lock out said range change mechanism and to immobilize said second element of the transmission output gears,
(6) a third sun gear 61s, 65s,
(7) a third set of planetary pinions 41p2, 45p2 mounted on said carrier 41c, 45c intermeshed with both said third sun gear and said second set of planetary pinions 41p2, 45p2, and
(8) clutch means III for selectively causing said third sun gear to be driven by said mechanical input drive train;
whereby activation of said second brake means causes said transmission to operate in said one range, activation of said first brake means II causes said transmission to operate in a second range which is hydromechanical and activation of said clutch means causes said transmission to operate in a third range which is hydromechanical.

7. The transmission of claim 6 wherein:
said set of transmission output gears 31 contains three elements, the first of which is driven by said hydrostatic component, the second by said summing gearing and the third of which constitutes the transmission output and is driven as a resultant of the other two said elements;
whereby said first range is hydrostatic and said second and third ranges are split output hydromechanical ranges.

8. The transmission of claim 7 wherein:
(a) said hydrostatic component 2 produces three outputs;
(1) a first infinitely variable hydrostatic output 27c,
(2) a second infinitely variable hydrostatic output 24, and
(3) a third hydrostatic output 27r which is the average of said first and second variable outputs;
(b) there are two sets 31, 32 of transmission output gears wherein:
(1) the said first element 31s of the first set 31 is driven as a function of said first variable output,
(2) the said first element 32s of the other set 32 is driven as a function of said second variable output,
(3) the said second elements 31r, 32r, of which one 31r is driven by said summing gearing 41, 45, are interconnected by a cross shaft 36, and
(4) the said third elements 31c, 32c constitute right and left transmission outputs; and
(c) said second sun gear 41s, 45s is driven by said third hydrostatic output;
whereby said transmission is a multi-range, hydromechanical, split output, internal steer, steering transmission providing three successive ranges with independent torque ratios.

9. In a synchronous shifting, multi-range, split output, hydromechanical transmission having a mechanical input drive train, a hydrostatic component driven by said input drive train for producing a hydrostatic output, mechanical means defining plural independent power paths driven by said input drive train and said hydrostatic component to cause said transmission to be a split output transmission and a set of combining gears for producing a transmission output responsive to inputs received from either or both of two of said power paths of the split output transmission, and wherein said mechanical means includes a first power path mechanism interconnecting a first element of said combining gears with at least said hydrostatic component for causing the transmission to operate in one range; a range change mechanism also included within said mechanical means constituting a second of said power paths of the split output transmission for causing the transmission to operate in two additional ranges having torque ratios distinct from each other and from that of said one range, said range change mechanism comprising:

(a) a compound planetary gear set consisting of a single planetary carrier, three sets of planetary pinions mounted on said carrier, three sun gears each meshed with a corresponding set of said pinions, two ring gears each meshed with a corresponding set of said pinions, two brakes each for grounding a corresponding one of said ring gears, and a clutch wherein:
(1) the first set of pinions is meshed with the first sun gear which is driven by said mechanical input drive train and is also meshed with the first ring gear,
(2) the second set of pinions is meshed with the second sun gear which is driven by said hydrostatic component and is also meshed with the second ring gear which is connected to a second element of said combining gears, and
(3) the third set of pinions is meshed with the third sun gear which is attached by said clutch to said mechanical input drive train and is also meshed with said second set of pinions; and
(b) means for selectively activating said brakes and said clutch;
whereby activation of a first of said brakes causes said first sun and first set of pinions to drive said carrier mechanically at a speed reduced from that of said mechanical drive train and causes said second ring gear to be driven hydromechanically as a function of that reduced speed and the output of said hydrostatic component to provide an additional range which is hydromechanical
whereby activation of said clutch causes said third sun gear to be driven directly by said mechanical drive train and causes said second ring gear to be driven hydromechanically as a function of the speed of the mechanical drive train and the output of the hydrostatic component to provide a further hydromechanical range; and
whereby activation of the second one of said brakes locks out said range change mechanism and causes said transmission to drive only through said first power path to operate in said one range which is hydrostatic.

* * * * *